United States Patent
Flores et al.

(10) Patent No.: US 10,721,204 B2
(45) Date of Patent: Jul. 21, 2020

(54) LEVERAGING AN INTERNET OF THINGS TO INITIATE A PHYSICAL OBJECT TO PERFORM A SPECIFIC ACT THAT ENHANCES SECURITY

(71) Applicant: International Business Machines Corporation, Armonk, NY (US)

(72) Inventors: Christina I. Flores, Keller, TX (US); Romelia H. Flores, Keller, TX (US); Leonard S. Hand, Red Creek, NY (US); Timothy C. Kwan, Grand Prairie, TX (US); Michael A. Lau, Arlington, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/165,205

(22) Filed: Oct. 19, 2018

(65) Prior Publication Data
US 2019/0052593 A1      Feb. 14, 2019

Related U.S. Application Data

(62) Division of application No. 14/722,833, filed on May 27, 2015, now Pat. No. 10,135,777.

(51) Int. Cl.
*G06F 15/16* (2006.01)
*H04L 12/58* (2006.01)
*H04L 29/08* (2006.01)

(52) U.S. Cl.
CPC ............ *H04L 51/32* (2013.01); *H04L 67/306* (2013.01)

(58) Field of Classification Search
CPC .... B60W 10/08; B60W 20/14; B60W 30/025; B60W 30/18109; B60W 30/18127; H04L 51/32; H04L 67/306

(Continued)

(56) References Cited

U.S. PATENT DOCUMENTS

| 5,263,491 A | 11/1993 | Thornton |
| 7,328,671 B2 | 2/2008 | Kates |

(Continued)

FOREIGN PATENT DOCUMENTS

| CN | 103377397 A | 10/2013 |
| CN | 107683491 A | 2/2018 |

(Continued)

OTHER PUBLICATIONS

Benzi et al., Electricity smart meters interfacing the households, IEEE Transactions on Industrial Electronics, 2011, pp. 4487-4494. (Year: 2011).*

(Continued)

*Primary Examiner* — Moustafa M Meky
*Assistant Examiner* — Thorne E Waugh
(74) *Attorney, Agent, or Firm* — Cuenot, Forsythe & Kim, LLC

(57) ABSTRACT

An enterprise IoT concentrator can receive, from a first community IoT concentrator, first data corresponding to a security issue detected by at least one of a first plurality of devices located within a first physical environment, wherein the first plurality of devices are communicatively linked to one another within a first device domain that is a member of a first device community which includes the first community IoT concentrator. Responsive to receiving the first data, the enterprise IoT concentrator can process the first data to generate second data corresponding to the security issue. The second data can be configured to be processed by a second community IoT concentrator to initiate at least one device located within a second physical environment to perform a specific act that enhances security in the second physical environment. The enterprise IoT concentrator can communicate the second data to the second community IoT concentrator.

20 Claims, 7 Drawing Sheets

(58) Field of Classification Search
USPC .................................................. 709/203–248
See application file for complete search history.

(56) References Cited

U.S. PATENT DOCUMENTS

| | | | |
|---|---|---|---|
| 7,483,964 B1* | 1/2009 | Jackson | H04L 12/2809 |
| | | | 455/41.1 |
| 7,565,225 B2* | 7/2009 | Dushane | G05B 19/042 |
| | | | 700/276 |
| 8,690,578 B1 | 4/2014 | Nusbaum et al. | |
| 9,131,266 B2* | 9/2015 | Guedalia | H04W 4/70 |
| 9,146,147 B1 | 9/2015 | Bakhsh | |
| 9,168,000 B2 | 10/2015 | Dunki-Jacobs | |
| 9,189,021 B2 | 11/2015 | Jerauld | |
| 9,436,771 B1 | 9/2016 | Caragol | |
| 9,456,787 B2 | 10/2016 | Venkatraman | |
| 9,621,433 B2 | 4/2017 | Yoshida et al. | |
| 9,716,703 B2* | 7/2017 | Entezari | H04L 63/08 |
| 9,774,507 B2* | 9/2017 | Britt | H04W 4/70 |
| 10,006,896 B2 | 6/2018 | Fernstrom | |
| 10,130,277 B2 | 11/2018 | Connor | |
| 10,135,777 B2 | 11/2018 | Flores | |
| 2001/0049470 A1 | 12/2001 | Mault | |
| 2003/0009202 A1 | 1/2003 | Levine | |
| 2003/0065257 A1 | 4/2003 | Mault et al. | |
| 2004/0147816 A1 | 7/2004 | Policker | |
| 2009/0198506 A1* | 8/2009 | Gupta | G06Q 10/10 |
| | | | 705/1.1 |
| 2012/0009550 A1 | 1/2012 | Gayle | |
| 2012/0072302 A1 | 3/2012 | Chen | |
| 2012/0101874 A1 | 4/2012 | Ben-Haim | |
| 2012/0179665 A1 | 7/2012 | Baarman | |
| 2012/0317167 A1 | 12/2012 | Rahman | |
| 2013/0004923 A1 | 1/2013 | Utter, II | |
| 2013/0035871 A1 | 2/2013 | Mayou | |
| 2013/0038510 A1 | 2/2013 | Brin | |
| 2013/0105565 A1 | 5/2013 | Kamprath | |
| 2013/0267794 A1 | 10/2013 | Fernstrom et al. | |
| 2013/0273506 A1 | 10/2013 | Melowsky | |
| 2014/0064232 A1 | 3/2014 | Chang et al. | |
| 2014/0147829 A1 | 5/2014 | Jerault | |
| 2014/0241373 A1* | 8/2014 | Pasam | H04L 45/306 |
| | | | 370/400 |
| 2014/0242983 A1 | 8/2014 | Chang et al. | |
| 2014/0244001 A1 | 8/2014 | Glickfield | |
| 2014/0244770 A1 | 8/2014 | Kim et al. | |
| 2014/0256324 A1 | 9/2014 | Mohanty et al. | |
| 2014/0267299 A1 | 9/2014 | Couse | |
| 2014/0279341 A1 | 9/2014 | Bhardwaj | |
| 2014/0315162 A1 | 10/2014 | Ehrenkranz | |
| 2014/0335490 A1 | 11/2014 | Baarman | |
| 2014/0349257 A1 | 11/2014 | Connor | |
| 2015/0006695 A1* | 1/2015 | Gupta | H04L 67/18 |
| | | | 709/223 |
| 2015/0019342 A1* | 1/2015 | Gupta | G06Q 30/0269 |
| | | | 705/14.66 |
| 2015/0080672 A1 | 3/2015 | Biswas | |
| 2015/0088979 A1 | 3/2015 | Dong et al. | |
| 2015/0095790 A1 | 4/2015 | Yoshida et al. | |
| 2015/0118658 A1 | 4/2015 | Mayou | |
| 2015/0132722 A1 | 5/2015 | Menczel | |
| 2015/0140539 A1 | 5/2015 | Zamierowski | |
| 2015/0160363 A1 | 6/2015 | Hornbostel | |
| 2016/0006815 A1* | 1/2016 | Dong | G06F 9/46 |
| | | | 709/204 |
| 2016/0105402 A1* | 4/2016 | Soon-Shiong | H04L 63/0428 |
| | | | 713/164 |
| 2016/0171339 A1 | 6/2016 | Choi | |
| 2016/0180679 A1 | 6/2016 | Cowley | |
| 2016/0180723 A1 | 6/2016 | Tatourian | |
| 2016/0182528 A1* | 6/2016 | Entezari | H04L 63/107 |
| | | | 726/30 |
| 2016/0224750 A1 | 8/2016 | Kethman | |
| 2016/0301707 A1* | 10/2016 | Cheng | H04L 63/1425 |
| 2016/0308861 A1* | 10/2016 | Ameling | H04L 63/0876 |
| 2016/0323767 A1* | 11/2016 | Abdullah | H04W 16/18 |
| 2016/0328991 A1 | 11/2016 | Simpson | |
| 2016/0350514 A1 | 12/2016 | Rajendran | |
| 2016/0352673 A1 | 12/2016 | Flores et al. | |
| 2016/0366853 A1 | 12/2016 | Mainini | |
| 2017/0006135 A1* | 1/2017 | Siebel | G06F 8/10 |
| 2017/0006595 A1 | 1/2017 | Zakaria | |
| 2017/0018001 A1 | 1/2017 | Tunnell | |
| 2017/0024535 A1 | 1/2017 | Matz | |
| 2017/0039885 A1 | 2/2017 | Flores et al. | |
| 2017/0103677 A1 | 4/2017 | Bhattacharjee et al. | |
| 2017/0178534 A1 | 6/2017 | Prakash et al. | |
| 2017/0220751 A1 | 8/2017 | Davis | |
| 2018/0088098 A1 | 3/2018 | Mandava | |
| 2018/0343238 A1* | 11/2018 | Tola | H04L 67/12 |
| 2019/0079474 A1 | 3/2019 | Fadell | |

FOREIGN PATENT DOCUMENTS

| | | |
|---|---|---|
| DE | 112016001336 T5 | 12/2017 |
| EP | 2680210 A1 | 1/2014 |
| JP | 2002325288 A | 11/2002 |
| JP | 2003271635 A | 9/2003 |
| JP | 2011160382 A | 8/2011 |
| JP | 2014103304 A | 6/2014 |
| JP | 2018523183 A | 8/2018 |
| WO | 2014193950 A1 | 12/2014 |
| WO | 2015042379 A1 | 3/2015 |
| WO | 2015073722 A1 | 5/2015 |
| WO | 2014103304 A1 | 1/2017 |

OTHER PUBLICATIONS

Alcaraz et al., Security of industrial sensor netowrkk-based substations in the context of the internet of things, Ad Hoc Networks, 2013, pp. 1-26. (Year: 2013).*

WIPO Int'l. Appln. No. PCT/IB2016/053033, International Search Report and Written Opinion, dated Aug. 29, 2016, 9 pg.

Atzori, L. et al., "The Internet of Things: A survey," Computer Networks vol. 54, No. 15, 2010, pp. 2787-2805.

Miorandi, D. et al., "Internet of Things: Vision, Applications and Research Challenges," Ad Hoc Networks, vol. 10, No. 7, Sep. 2012, pp. 1497-1516.

Gubbi, J. et al., "Internet of Things (IoT): A Vision, Architectural Elements, and Future Directions," Future Generation Computer Systems, vol. 29, 2013, pp. 1645-1660.

Gazis, V. et al., "Wireless Sensor Networking, Automation Technologies and Machine to Machine Developments on he Path to the Internet of Things," In the IEEE 16th Panhellenic Conf. on Informatics (PCI), 2012, pp. 276-282.

Bandyopadhyay, S. et al., "Lightweight Internet Protocols for Web Enablement of Sensors Using Constrained Gateway Devices," In the IEEE 2013 Int'l. Conf. on Computing, Networking and Communications (ICNC), 2013, pp. 333-340.

"Tracking Dietary Intake Patterns of Individuals Using Social Media", Ip.Com Prior Art Database, Disclosure No. 000231487D, Oct. 2, 2013, 5 pg.

Siddique, A., "Google Glass Features; How Medical Uses Will Revolutionize Your Healthcare [video]", [online] Medical Daily, IBT Media Inc. © 2015, Mar. 12, 2013, retrieved from the Internet: <http://www.medicaldaily.com/google-glass-features-how-medical-uses-will-revolutionize-your-healthcarevideo-244613>, 18 pg.

IBM: List of IBM Patents or Patent Applications Treated as Related, 2 pg.

Flores et al., "Leveraging an Internet of Thing to Initiate a Physical Object to Perform a Specific Act That Enhances an Interaction of a User With the Physical Object", U.S. Appl. No. 14/722,722, filed May 27, 2015, 52 pages (A copy is not provided as this application is available to the Examiner.

(56) References Cited

OTHER PUBLICATIONS

Flores et al., "Monitoring and Status Detection for consumable Items", U.S. Appl. No. 14/821,205, filed Aug. 7, May 27, 2015, 55 pages (A copy is not provided as this application is available to the Examiner.

* cited by examiner

600

Receive, from a first community IoT concentrator, data corresponding to a security issue detected by at least one of a first plurality of devices located within a first physical environment
602

Process the first data to generate second data corresponding to the security issue, the second data configured to be processed by at least a second community IoT concentrator to initiate at least one of a second plurality of devices located within a second physical environment to perform a specific act that enhances security in the second physical environment, wherein the second plurality of devices are communicatively linked to one another within a second device domain, wherein the second device domain is a member of a second device community comprising the second community IoT concentrator
604

Automatically communicate the second data corresponding to the security issue to at least the second community IoT concentrator
606

FIG. 6

LEVERAGING AN INTERNET OF THINGS TO INITIATE A PHYSICAL OBJECT TO PERFORM A SPECIFIC ACT THAT ENHANCES SECURITY

BACKGROUND

The present invention relates to the physical objects which are communicatively linked to a network and, more particularly, to an Internet of Things.

With the recent advent of the Internet of Things, more and more real-world devices are becoming connected to the Internet. In this way, many devices are now able to send and/or receive relevant data for a multitude of purposes. For example, U.S. Pat. Pub. No. 2014/0064232 described describes "communications between machines". U.S. Pat. Pub. No. 2014/024470 describes an "interworking procedure between social media service" and a "machine to machine (M2M) service". International Pub. No. WO 2014/193150 describes "a system comprises a plurality of devices that include an intermediary node that communicates with at least some of the plurality of devices via a network". WO 2014/193150 also describes "systems that can aggregate data at an application-protocol layer".

Current solutions, however, do not leverage the Internet of Things to enhance customer service provided by an enterprise, and partners of the enterprise, at different service locations. For example, if a person visits a car dealership to look at vehicles, a sales associate may interact with the person and collect various types of information, such as the person's name, address, the type of vehicle the person is interested in, etc. The sales associate may even enter the person's information into a contact management system. Contact management systems, however, typically are only accessible by employees of the enterprise that owns the dealership. If the person does not find a vehicle he/she likes, and chooses to visit another car dealership owned by another enterprise, that other car dealership is not able to utilize the person's information collected at the first car dealership to optimize the vehicle selection experience for that person. Thus, many opportunities to sell vehicles are lost.

SUMMARY

According to an embodiment of the present invention, a method includes receiving, by a first community Internet of Things (IoT) concentrator including at least one processor, first data corresponding to an interaction of a user with at least one of a first plurality of physical objects, the first plurality of physical objects communicatively linked to one another within a first device domain. The method also includes, responsive to receiving the first data corresponding to the interaction of the user with the at least one of the first of the plurality of physical objects, initiating, by the first community IoT concentrator or a second IoT concentrator, based at least in part on the first data, at least one of a second plurality of physical objects to perform a specific act that enhances an interaction of the user with the at least one of the second plurality of physical objects. The second plurality of physical objects can be communicatively linked to one another within a second device domain. This approach offers new insights across devices within a device community and across device domains to be determined, thus maximizing the capability of each device. Moreover, information captured by each device can be utilized to enhance subsequent user interactions with various other devices and/or sales associates. Moreover, by leveraging the IoT in this manner, sales opportunities are increased, thus increasing revenue.

In one optional arrangement, the method can include processing, by the first community IoT concentrator or the second IoT concentrator, the first data corresponding to the interaction of the user with the at least one of the first of the plurality of physical objects and, based on processing the first data, identifying a user pattern of the user. Initiating, by the first community IoT concentrator or the second IoT concentrator, based at least in part on the first data, at least one of a second plurality of physical objects to perform a specific act that enhances the interaction of the user with the at least one of the second plurality of physical objects can include selecting the specific act based in the identified user pattern of the user.

In a further optional arrangement, the first community IoT concentrator or the second community IoT concentrator can configure at least one device setting in the at least one of the second plurality of physical objects based at least in part on the identified user pattern of the user.

In one optional arrangement, the community IoT concentrator can present to the user information relevant to the at least one of the second plurality of physical objects, the information selected based at least in part on the identified user pattern of the user.

In one optional arrangement, the method further can include receiving, by the first community IoT concentrator or the second IoT concentrator, second data including at least one type of data selected from a group consisting of a user profile of the user, user pattern data and user preferences, the second data indicating a level of interaction with at least the second plurality of physical objects desired by the user. Initiating the at least one of the second plurality of physical objects to perform the specific act that enhances the interaction of the user with the at least one of the second plurality of physical objects further can be based at least in part on the second data.

In one optional arrangement, the method further can include processing the first data or the second data to identify at least one business partner that provides a service that will be of interest to the user. The method also can include communicating to the at least one business partner at least a portion of the first data or the second data.

In one optional arrangement, the method further can include processing at least the first data or the second data to identify at least one social media system that is of interest to the user. The method also can include creating a post in the social media system on behalf of the user, the post including at least a portion of the first data, the second data or third data derived from the first data or second data.

In one optional arrangement, the method further can include initiating, by the first IoT concentrator or the second IoT concentrator, a communication dialog between the at least one of the second plurality of physical objects and the user. Initiating the at least one of the second plurality of physical objects to perform the specific act that enhances the interaction of the user with the at least one of the second plurality of physical objects further can be based at least in part on information obtained from the user during the dialog between the at least one of the second plurality of physical objects and the user.

In one optional arrangement, the first device community further includes the first device domain.

In one optional arrangement, the first device domain and the second device domain are members of a first device community including the first community IoT concentrator, the first device domain and the second device domain.

Accordingly, the user interaction with physical objects can be enhanced across a plurality of device domains within a device community, as well as device communities within a global IoT community.

In one optional arrangement, the method further can include identifying, by an enterprise IoT concentrator, device patterns across a plurality of device domains associated with at least one entity selected from a group consisting of an enterprise and at least one enterprise partner. The plurality of device domains can include at least the first device domain and the second device domain. The device patterns can represent data collected by at least a set of first physical devices within the first plurality of physical objects and a set of second physical devices within the second plurality of physical objects.

According to another embodiment of the present invention, a method includes receiving, by an enterprise Internet of Things (IoT) concentrator including at least one processor, from a first community IoT concentrator first data corresponding to a security issue detected by at least one of a first plurality of devices located within a first physical environment. The first plurality of devices can be communicatively linked to one another within a first device domain. The first device domain can be a member of a first device community including the first community IoT concentrator. Responsive to receiving, by the enterprise IoT concentrator, the first data corresponding to the security issue detected by the at least one of the first plurality of devices located within the first physical environment, the first data can be processed, by the enterprise IoT concentrator, to generate second data corresponding to the security issue. The second data can be configured to be processed by at least a second community IoT concentrator to initiate at least one of a second plurality of devices located within a second physical environment to perform a specific act that enhances security in the second physical environment. The second plurality of devices can be communicatively linked to one another within a second device domain. The second device domain can be a member of a second device community including the second community IoT concentrator. Further, the enterprise IoT concentrator can automatically communicate the second data corresponding to the security issue to at least the second community IoT concentrator. By leveraging the IoT in this manner to facilitate communication of data among device domains in different device communities, the level of security provided by the device domains is significantly increased in comparison to traditional security systems.

According to another embodiment of the present invention, a system includes a processor programmed to initiate executable operations which perform the various steps and methods disclosed herein.

According to another embodiment of the present invention, a computer program includes a computer readable storage medium having program code stored thereon. The program code is executable by a processor to perform the various steps and methods disclosed herein.

BRIEF DESCRIPTION OF THE DRAWINGS

FIG. 6 presents a flow chart illustrating an example of a method of initiating a device to perform a specific act that enhances security in a physical environment.

DETAILED DESCRIPTION

Figure 1:
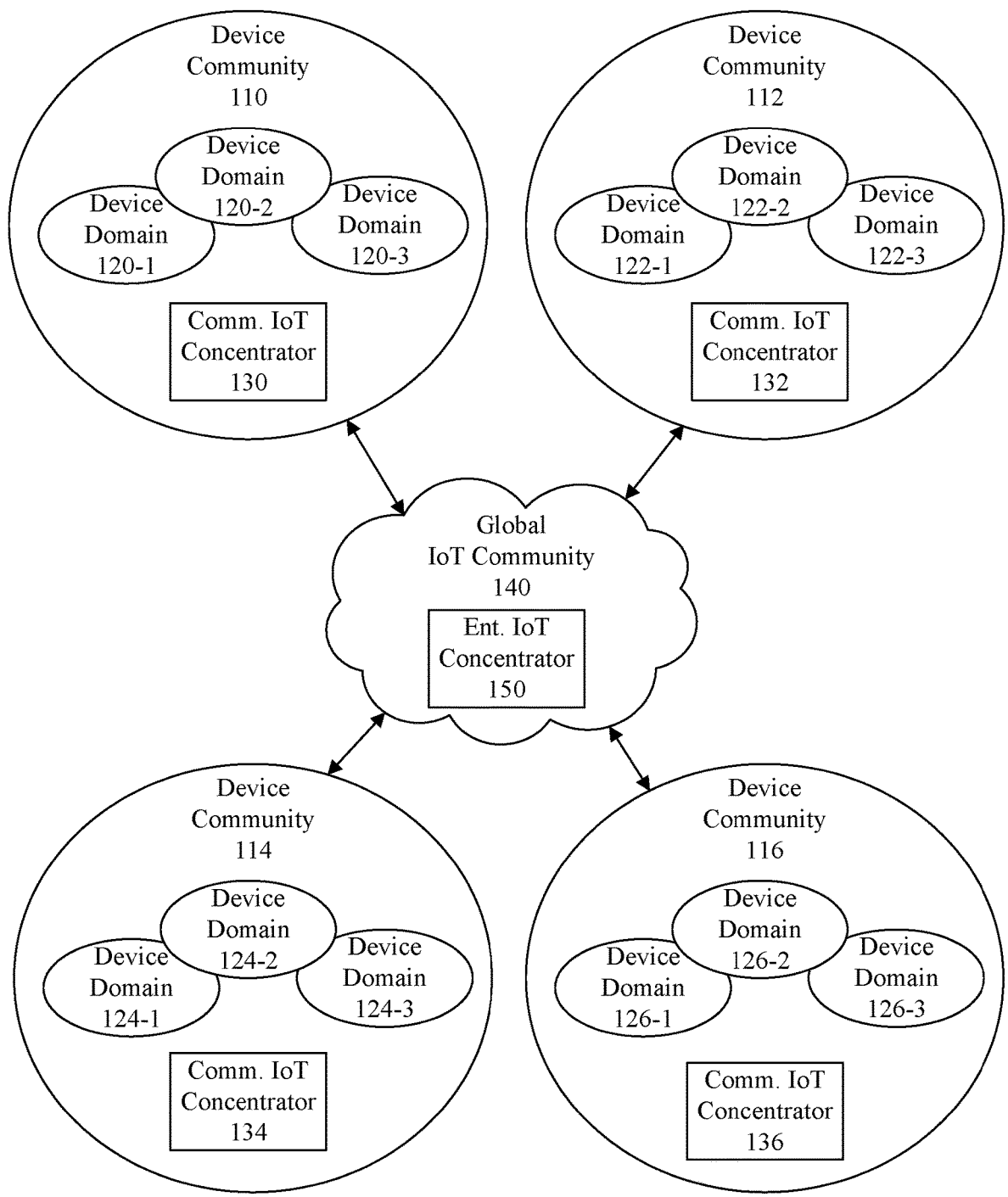
FIG. 1 is a block diagram illustrating an example of an Internet of Things (IoT) system.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to the Internet of Things (IoT), and, more particularly, to communication among physical objects via the IoT. In accordance with the arrangements described herein, a user (e.g., customer) can interact with one or more physical objects, each of which includes one or more devices that are members of a device community. By virtue of having one or more of the devices, each physical object also can be considered to be a member of the device community. The device community enables interactive communication and collaboration across one or more types of devices contained in the physical objects. Rather than many devices individually reporting data to a central repository, the devices can be placed into a device community containing one or more device domains. The device community allows the devices within that device community, including devices across different device domains, to communicate data amongst one another. For example a device can participate in a sale domain, an environmental domain, marketing domain, key product domain, physical location domain and data gathering domain at the same time.

A device community can include a community IoT concentrator to which all devices within a device community are communicatively linked. The community IoT concentrator can provide communication links from devices in the device community to a global IoT community, for example to an enterprise IoT concentrator. Accordingly, device information is easily shared among devices within a device community and can be propagated, as appropriate, to the global IoT community via the community IoT concentrator. Information in the global IoT community can be collected from multiple device communities and analyzed for overall trends. This enables the sharing of device information to be accomplished within a specific physical location or business, or to share device information on a more global scale to a business enterprise or with external business partners. Accordingly, localized data can be obtained and analyzed as interactions by a customer are performed at a local physical location and shared within that physical location or more globally.

This approach offers new insights across devices within a device community and across device domains to be determined, thus maximizing the value of each device. In addition, through the sharing of device information across the global IoT community, additional analytics can be performed to determine patterns of device behavior across device communities to maximize device behavior across an enterprise or perhaps drive new business models with other partners. Moreover, integrating device communities with a global IoT community enables a flexible approach to the IoT, making effective real-time decisions within a device community as well as more enterprise appropriate decisions across various device communities.

Several definitions that apply throughout this document now will be presented.

As defined herein, the term "Internet of Things" means a computing environment in which physical objects are embedded with devices which enable the physical objects to achieve greater value and service by exchanging data with other systems and/or other connected devices. Each physical object is uniquely identifiable through its embedded device(s) and is able to interoperate within an Internet infrastructure. The acronym "IoT," as used herein, means "Internet of Things."

As defined herein, the term "device domain" means a set of a plurality of devices, each of which is associated with a physical object, that are communicatively linked to one another, and are configured for user interaction with the physical objects with which the devices are associated.

As defined herein, the term "device community" means a set of one or more device domains and at least one Internet of Things concentrator to which devices in the one or more device domains are communicatively linked.

As defined herein, the term "global IoT community" means a system, including at least one enterprise IoT concentrator, that acquires and processes information from a plurality of device communities.

As defined herein, the term "community IoT concentrator" means a system, including at least one processor and memory, configured to provide analytical processing and data in support of a set of one or more device domains.

As defined herein, the term "enterprise IoT concentrator" means a system, including at least one processor and memory, configured to provide analytical processing and data in support of a set of one or more device communities.

As defined herein, the term "ad-hoc network" means a decentralized wireless network comprising a plurality of nodes, wherein each node is a device having equal status in the network as other nodes of the network and being free to communicate with any other node of the network, and each node being configured to participate in routing of data in the network by forwarding data for other nodes.

As defined herein, the term "user" means a person (i.e., a human being).

As defined herein, the term "customer" means user who is a candidate to purchase a product or service offered for sale.

As defined herein, the term "user pattern" means data representing traits, acts, tendencies and/or observable characteristics of a user. A user pattern can be generated for a user by processing data generated by a user's interaction with one or more device communities.

As defined herein, the term "device community owner" means a person who uses a device IoT dashboard to access information collected for a device community. A device community owner can be, for example, a manager, an administrator, a sales associate, a person responsible for disseminating information to physical objects/devices within a device community, a person responsible for disseminating information to customers or business partners, or the like.

As defined herein, the term "enterprise IoT owner" means a person who uses a global IoT dashboard to access information collected for a global IoT community. An enterprise IoT owner can be, for example, a manager, an administrator, a planner, a person responsible for identifying and monitoring appropriate goals for an enterprise, or the like.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

FIG. 1 is a block diagram illustrating an example of an Internet of Things (IoT) system 100. The IoT 100 can include a plurality of device communities 110, 112, 114, 116. Each device community 110-116 can include one or more device domains 120, 122, 124, 126. For example, the device community 110 can include one or more device domains 120-1, 120-2, 120-3, the device community 112 can include one or more device domains 122-1, 122-2, 122-3, the device community 114 can include one or more device domains 124-1, 124-2, 124-3, the device community 116 can include one or more device domains 126-1, 126-2, 126-3, and so on. Each device domain 120-126 includes a plurality of devices, and each device can be associated with a physical object. In this regard, one or more devices can be associated with the same physical object.

By way of example, a physical object within the device domain 120-1 may be an automobile. The automobile can include one or more devices that are communicatively linked to one another, as well as to other devices in the same device domain 120-1. In illustration, the automobile can include a processing system, an audio system, an air conditioning system, and various other devices. The automobile also can include a display that displays various types of information to a user. In the case that the display is a touchscreen, the user can interact with the processing system, audio system, air conditioning system, etc. by entering user inputs as touches on the display. A user also can enter user inputs by controlling a cursor with a user input device, selecting buttons, moving dials or knobs, depressing buttons or switches, and the like. The audio system, air conditioning system, as well as other devices in the automobile, can be communicatively linked to the processing system. Accordingly, the processing system can control various functions performed by the devices. The automobile also can include a network adapter (e.g., a WiFi™ network adapter, a cellular radio, etc.) via which the processing system and various devices in the automobile may communicatively link to other devices in the device domain 120-1. For example, the devices may communicatively link to a processing system of a kiosk in a showroom. In one aspect, the various devices in a device domain 120-126 may be communicatively linked to one another via an ad-hoc network. Accordingly, the devices may be communicatively linked without the need of a router or switch.

Each device community 110-116 also can include a respective community IoT concentrator 130, 132, 134, 136 to which devices in the device community 110-116 are communicatively linked. Via the community IoT concentrators 130-136, various device domains 120-126 within the respective device communities 110-116 can share data among one another. For example, via the community IoT concentrator 130, devices in the device domains 120-1, 120-2, 120-3 can share data among one another. Moreover, each community IoT concentrator 130-136 can include various components, which will be described, that provide analytical processing and data in support of the respective device community 110-116. Accordingly, information and device analytics can be leveraged locally within the device communities 110-116 to tailor device behavior and user interactions based on user interactions with the devices contained in the device communities 110-116.

Each device community 110-116 can be communicatively linked to, and be part of, a global IoT community 140. Via the Global IoT community 140, data acquired and/or generated by the various device communities 110-116 can be leveraged across an enterprise and/or with partners of the enterprise. The data can be tracked and analyzed by the global IoT community 140. Thus, information gained from various devices in the device communities 110-116 can be analyzed as a whole, for example to identify various trends, customer preferences, occurrence of events, etc. In illustration, the global IoT community 140 can include an enterprise IoT concentrator 150 to which each of the community IoT concentrators 130-136 are communicatively linked and provide device data. The enterprise IoT concentrator 150 can include various components, which will be described, that provide analytical processing of the data to analyze information gained from the device communities 110-116, including analysis of the various devices across the device communities 110-116. Accordingly, analytics can be leveraged across an enterprise and/or with partners of the enterprise to capture device patterns across the device communities.

The community IoT concentrators 130-136 can communicatively link to the enterprise IoT concentrator 150 via one or more networks. A network may include connections, such as wire, wireless communication links, or fiber optic cables. A network can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

By linking the community IoT concentrators 130-136 to the enterprise IoT concentrator 150, the IoT 100 can provide to a user a customized user experience, based on the user's experiences in one or more of the device communities 110-116, regardless of which device community 110-116 the user presently interacting. Moreover, the community IoT concentrators 130-136 interacting with the enterprise IoT concentrator 150 can control the level of interaction, both in breadth and depth, of the user with the community IoT concentrators 130-136.

Further, by linking the community IoT concentrators 130-136 to the enterprise IoT concentrator 150, the present arrangements expand enterprise analytics capabilities across the IoT for physically dispersed locations. In addition, the present arrangements improve customer experience with devices through targeted advertisements and customer preferences to drive higher customer/revenue impact. The present arrangements also allow for customized user interactions without requiring a physical person (e.g., sales associate) to be present to assist a user. In this regard, retailers can be open with expanded hours without the requirement of a full sales associate staff, thereby increasing sales revenue. Also, the arrangements described herein position an enterprise to explore new services to offer to customers via business partners.

In another arrangement, the community IoT concentrators 130-136 can be linked to the enterprise IoT concentrator 150 in a security environment to enhance security among a plurality of physical environments (e.g., house, offices, facilities, etc.). For example, security monitoring data can be communicated by each of the community IoT concentrators 130-136 with the enterprise IoT concentrator 150. When a security related issue is detected in a device community 110, the enterprise IoT concentrator 150 can alert other device communities 112-116 of the security issue. In response, the other community IoT concentrators can initiate devices to implement additional security measures, for example to turn on lights, activate security sensors, present an audible and/or visible alert within the respective physical environments, and the like. Thus, the plurality of device communities 110-116 can, via the global IoT community 140, cooperate with one another to provide a higher level of security in comparison to a single alarm system.

Figure 2:
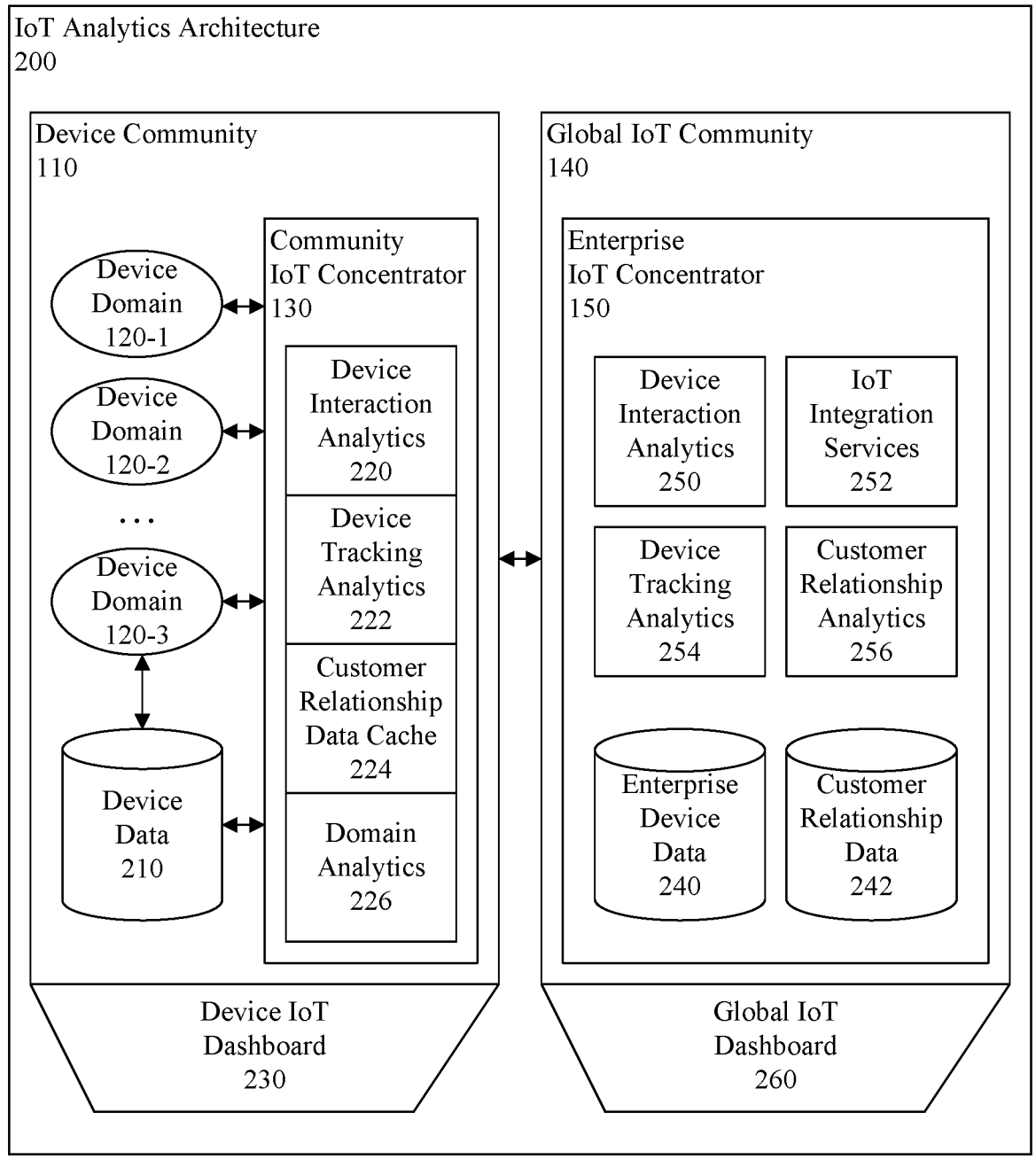
FIG. 2 is a block diagram illustrating an example of an IoT analytics architecture.

FIG. 2 is a block diagram illustrating an example of an IoT analytics architecture 200. The IoT analytics architecture 200 can include each of the device communities 110-116 (represented in FIG. 2 by the device community 110 for simplicity) and the global IoT community 140. As noted, the device community 110 can include the device domains 120-1, 120-2, 120-3 and the community IoT concentrator 130. The device community 110 also can include a datastore in which device data 210 generated by various devices in the device domains 120-1, 120-2, 120-3 is stored. The datastore can be hosted on a data storage device and can include one or more data tables (e.g., database tables), files or the like in which the device data 210 is stored. The devices can be communicatively linked to the data storage device directly or via the community IoT concentrator 130. The device data 210 can include all information relevant to the devices in the device domains 120-1, 120-2, 120-3. This information may include, but is not limited to, data indicating which devices are active, which devices are most active, the times at which individual devices are most active, and the location of individual devices at different times. The information also can include device community data, such as information indicating at what times of day the device community is most active, information indicating transactions occurring between devices, strengths and weaknesses of the device community 110 (by device and/or by geography), etc.

The community IoT concentrator 130 can include device interaction analytics 220, device tracking analytics 222, a customer relationship data cache 224 and domain analytics 226. The device interaction analytics 220 can track user interactions with devices in the device community 110 (i.e., devices that are members of the device domains 120-1, 120-2, 120-3). The types of information that can be tracked include, but are not limited to, information relating to which devices users are interacting, how frequently users are interacting with the devices, the duration of such interactions, the time period of the interactions, etc. The device interaction analytics 220 also can determine appropriate responses to information requests and action requests provided by users.

The device tracking analytics 222 can track the movement of devices in the device community 110. For example, the device tracking analytics 222 can determine where a device is located relative to its surroundings and relative to other devices in the device community 110. The device tracking analytics 222 also can process device location information, as well as other information gathered in the device community 110, to determine opportune placement for devices within the device community 110. For example, if a significant number of users interacting with a kiosk in an automobile showroom are inquiring about a certain model of vehicle in a certain color, the device tracking analytics 222 can determine that the certain model in the certain color should be placed in the showroom near the kiosk. Indeed, based on information obtained in the device community, the device tracking analytics 222 can generate a recommendation of which vehicles, including their colors and options, should be located in the showroom and where those vehicles should be positioned. The recommendation can be provided to a manager in charge of the showroom. In another example, if a significant number of users are looking at houses having particular characteristics in a certain geographic region, such as having an open floor plan, including a pool, including a bonus room, etc., the device tracking analytics 222 can determine that there is a demand for similar types of houses. Based on information obtained in the device community, the device tracking analytics 222 can generate a recommendation of the types of houses that should be built to server a particular real estate market. That recommendation can be provided to a manager of a home construction company.

The customer relationship data cache 224 can store customer profile data. In illustration, users can interact with devices in the device community 110 anonymously or log into the device community 110. The first time a user attempts to log into the device community 110, the user can be prompted to provide certain identifying information from which a customer profile can be created and stored in the customer relationship data cache 224. The identifying information can include, for example, the user's name, gender, age, date of birth, address, telephone number, e-mail address, instant messaging address, occupation, social security number, driver's license number, etc. That data can be made available to each of the devices in the device community 110 with which the user may choose to interact. Responsive to the user leaving the device community 110 (e.g., the user logs out of the device community or leaves the location where the device community 110 is located), the customer profile for that user can be communicated to a customer relationship data 242 maintained by the enterprise IoT concentrator 150. Thus, if the user goes to another location and interacts with devices in another device community 112-116, that user's customer profile data can be communicated to the community IoT concentrator 132-136 for that device community 112-116. Accordingly, the user can log into that other device community 112-116 using his/her customer profile.

The domain analytics 226 can analyze data pertaining to the device domains 120-1, 120-2, 120-3. For example, the domain analytics 226 can determine which devices in a sales domain are utilized by users most frequently or which devices in a marketing domain had uptake of presented marketing offers.

The information obtained and/or generated by the device interaction analytics 220, device tracking analytics 222, a customer relationship data cache 224 and domain analytics 226 can be processed by the IoT concentrator to create device interaction reports. The device interaction reports can provide a detailed description of user interactions with devices in the device community 110. The reports can serve to provide information to users and to provide information to the global IoT community 140.

Within the device community 110 a device IoT dashboard 230 can be provided. The device IoT dashboard 230 can be accessed using certain types of devices in the device community 110, for example kiosks, computers, tablet computers, or the like. In one aspect, the device IoT dashboard 230 can be hosted by the community IoT concentrator 130, though this need not be the case. In the case the device IoT dashboard 230 is not hosted by the community IoT concentrator 130, but instead is hosted by another processing system, such processing system can be communicatively linked to the community IoT concentrator 130, for example via one or more suitable networks.

The device IoT dashboard 230 can provide a user interface used by owners of the device community 110 to configure the community IoT concentrator 130, as well as access information obtained or generated by the community IoT concentrator 130. In illustration, the device IoT dashboard 230 can indicate where devices and/or physical objects are located, for example within a building, in a lot, in a warehouse, or the like. The device IoT dashboard 230 also can present reports, alerts, graphs and other data obtained and/or generated by the community IoT concentrator 130. Based on the information presented by the device IoT dashboard 230, device community owners can determine which devices and physical objects within the device community 110 are generating revenue, inventory levels, device usage, etc. The device IoT dashboard 230 also can be leveraged to determine what types of devices and physical objects are having appreciable impact across the device community 110, results of marketing campaigns on specific devices and/or physical objects, alert device community owners of use of certain devices and/or physical objects by important customers, etc. Accordingly, this information can be considered by device community owners to determine additional physical objects and/or devices that should be acquired. Further, in one arrangement, the community IoT concentrator 130 can provide a recommendation of which physical objects and/or devices that should be acquired for the device community 110 based on the information.

In a further arrangement, via the device IoT dashboard 230, device community owners can access certain devices in the device community. For example, the device community owners can monitor and/or control operation of various devices via the IoT dashboard 230, review data and/or operating logs, configure certain devices in the device community, etc. Moreover, via the device IoT dashboard 230, a device community owner can configure the community IoT concentrator 130 to initiate devices and/or physical objects to perform specific acts to enhance user interaction with the physical objects, as will be described.

As noted, the global IoT community 140 can include the enterprise IoT concentrator 150. The global IoT community 140 also can include a datastore in which enterprise device data 240 is stored. The datastore can be hosted on a data storage device and can include one or more data tables (e.g., database tables), files or the like in which the enterprise device data 240 is stored. The enterprise device data 240 can include device data 210 collected by each of the device communities 110-116 that are part of the global IoT community 140. For example, device data collected by each of the device communities 110-116 can be mirrored to the enterprise device data 240 in real time as the data is collected, or periodically synchronized with the enterprise device data 240. The enterprise device data 240 can be leveraged by the enterprise IoT concentrator 150 to perform analytical processing of the data. For example, based on the success of a kiosk at a particular location in a particular showroom, the enterprise IoT concentrator 150 can recommend that kiosks in other showrooms be positioned in a similar manner, recommend certain physical objects/devices be installed in houses that are for sale, and so on. Still, numerous other recommendations and determinations can be made based on the enterprise device data 240, and the present arrangements are not limited in this regard.

The global IoT community 140 also can include a datastore in which the customer relationship data 242 is stored. The customer relationship data 242 can include customer relationship data collected by each of the device communities 110-116 that are part of the global IoT community 140. As noted, customer relationship data collected by each of the device communities 110-116 can be synchronized from their respective customer relationship data caches 224 responsive to users logging out of the respective device communities 110-116 or leaving locations serviced by the respective device communities 110-116. In another arrangement, the customer relationship data gathered by the respective device communities 110-116 can be synchronized, in real time or periodically, with the customer relationship data 242. Further, customer relationship data 242 for a user can be communicated to the community IoT concentrator 130 to pre-populate the customer relationship data cache 224, for example responsive to the user logging into the device community 110. The customer relationship data 242 data can indicate basic profile information of users, such as name, age, gender, user preferences, etc. Further, for each user, the customer relationship data 242 can indicate locations, serviced by the device communities 110-116, visited by the user. The customer relationship data 242 also can indicate specific device communities 110-116 with which a user has interacted, specific devices and/or physical objects within the device communities 110-116 the user has interacted, and/or the nature of the user interactions with the specific devices and/or physical objects.

The global IoT community 140 further can include device interaction analytics 250, IoT integration services 252, device tracking analytics 254 and customer relationship analytics 256. The device interaction analytics 250 can track user interactions with devices in the device communities 110-116 at an enterprise level. For example, the device interaction analytics 250 can process the customer relationship data 242 to identify user trends with regard to device interaction in the individual device communities 110-116 and across the device communities 110-116. In illustration, the device interaction analytics 250 can identify device interaction trends that are common across the device communities 110-116 and device interaction trends that are unique to one or more device communities 110-116.

The IoT integration services 252 can externalize application services to business partners and social media systems, for example via the Internet. Examples of the application services include, but are not limited to, time spent by a particular user at a device in a showroom, product purchase information, etc. In one arrangement, the IoT integration services 252 can provide users an opportunity to opt-in, or otherwise give permission, for their information to be shared with business partners and/or social media systems. If a user does not opt-in or give permission for their information to be shared, such information can be maintained by the global IoT community 140 and device communities 110-116 in confidence. If, however, the user does opt-in or give permission for their information to be shared with business partners and/or social media systems, the IoT integration services 252 can externalize the application services to business partners and/or social media systems for, or on behalf of, the user.

In illustration, if a user spends a certain amount of time interacting with one or more devices in a particular automobile, or uses a kiosk to obtain further information about an automobile, via the IoT integration services 252, an application can prompt the user to authorize a post on behalf of the user in a social media system. In another example, if a user is considering purchasing a house, and is looking at houses in a particular neighborhood or city, via the IoT integration services 252, an application can prompt the user to authorize a post on behalf of the user in a social media system. The user can authorize the post to be posted in the user's thread and/or in a thread for the enterprise. This not only serves as a way to advertise the vehicle/enterprise, neighborhood, city or real estate services, but also provides a means for the user to share their news about purchasing, or looking to purchase, a new vehicle or house with their family and friends.

In another aspect, if a user purchases a product (e.g., house, vehicle, furniture, etc.) or service, such purchase potentially may represent a business opportunity for a business partner of the enterprise selling the product or service. Thus, information regarding the user and purchase can be shared with the business partner. In one arrangement, the user can be prompted to indicate whether the user authorizes the sharing of such information, and the information is only shared with the user's authorization. By way of example, responsive to a user test driving or purchasing a vehicle, the user's contact information and the vehicle information can be provided to an automobile insurance system is able to provide to the user a quote for providing insurance on the vehicle. Similarly, responsive to a user looking at a house for sale, the user's contact information and the house information can be provided to a home insurance system that is able to provide to the user a quote for providing insurance for the house. This can save the user time in locating a suitable insurance provider, requesting an insurance quotation, etc.

Moreover, the arrangements described herein can streamline the process for obtaining insurance since the insurance system already will have the vehicle or house information. In some cases, the cost of insurance is a consideration when a user is deciding whether to purchase a vehicle or house. The user and vehicle/house information can be automatically provided to an insurance system, and provided back to the user while the user still is in the showroom looking at the vehicle or house. For example, the quotation can be sent to the user via an instant message or e-mail communicated to the user's smart phone or tablet computer, or the quotation can be provided to a device used by a sales associate who can present the quotation to the user. This can help the user make a buying decision without the user ever leaving the showroom or house, which can help to increase sales; statistics show that when a person leaves a showroom before making a purchase decision, the likelihood the person will make the purchase decreases in comparison to when the person makes the purchase decision while still in the showroom.

The device tracking analytics 254 can process the enterprise device data 240 to detect and track device patterns, such as device usage and/or device movement, that may be occurring in the device communities 110-116. Based on the device patterns, the device tracking analytics 254 can identify which types of devices are most interacted with across the device communities 110-116 or in a subset of the device communities 110-116. This information can be accessed by enterprise IoT owners to help such owners determine which types of devices are worth further investment, which types of devices are not worth further investment, etc. The information provided can be at a scale larger than any one specific device community 110-116, but can be narrowed down to specific device communities 110-116 if desired. Thus, the device tracking analytics 254 facilitates decision making at an enterprise level.

The customer relationship analytics 256 can track user trends, both at the device community 110-116 level and at the global IoT community 140 level. The customer relationship analytics 256 can gain information regarding, for example, which physical objects and/or devices a user is interacting, the user preferences, and which device communities 110-116 the user has visited. The information can be tracked and categorized, for example based on age group, geographic location, gender, background, etc., and stored as customer relationship date 242. Further, the customer relationship analytics 256 can make user information available at the enterprise level available to one or more device communities 110-116. Responsive to information related to a user being updated at the device community 110-116 level, the update can be propagated to the customer relationship analytics 256 to update the customer relationship data 242 for access across the enterprise. For example, if a user visits a first showroom or house serviced by the device community 110, and later visits a second showroom or house serviced by the device community 112, information regarding the user's interaction with physical objects/devices in the device community 110 can be made available to the device community 112. Accordingly, processes can be implemented in the device community 112 to enhance the user's experience within the second showroom or house, as will be described.

Within the global IoT community 140 a global IoT dashboard 260 can be provided. The global IoT dashboard 260 can be accessed using kiosks, computers, tablet computers, or the like. In one aspect, the global IoT dashboard 260 can be hosted by the enterprise IoT concentrator 150, though this need not be the case. In the case the global IoT dashboard 260 is not hosted by the enterprise IoT concentrator 150, but instead is hosted by another processing system, such processing system can be communicatively linked to the enterprise IoT concentrator 150, for example via one or more suitable networks.

The global IoT dashboard 260 can provide a user interface used by owners of the enterprise IoT to configure the global IoT dashboard 260, as well as access information obtained or generated by the enterprise IoT concentrator 150. In illustration, the enterprise IoT concentrator 150 can present reports, alerts, graphs and other data obtained and/or generated by the enterprise IoT concentrator 150. Based on the information presented by the global IoT dashboard 260, enterprise IoT owners can determine which types of devices and physical objects within the device communities 110-116 are generating revenue, which types of service information is bringing in revenue from business partnerships, etc. The global IoT dashboard 260 also can be leveraged to determine what types of devices and physical objects are having appreciable impact across the enterprise. Accordingly, this information can be considered by enterprise IoT owners to determine additional physical objects and/or devices that should be acquired. Further, in one arrangement, the enterprise IoT concentrator 150 can, based on the information, provide a recommendation of which physical objects and/or devices that should be acquired for the enterprise.

The information provided by the enterprise IoT concentrator 150 via the global IoT dashboard 260 also can be used by enterprise IoT owners to identify which services being provided by the IoT integration services 252 are providing value, and determine the types of information to be made available to business partners. For example, if a particular insurance company is providing helpful information to customers of the enterprise, information pertaining to demographics of customers can be provided to the insurance companies contact information system. The insurance company can use this information to mail advertisements to particular customers, or to residences in a particular neighborhood where a number of customers are located.

Figure 3:
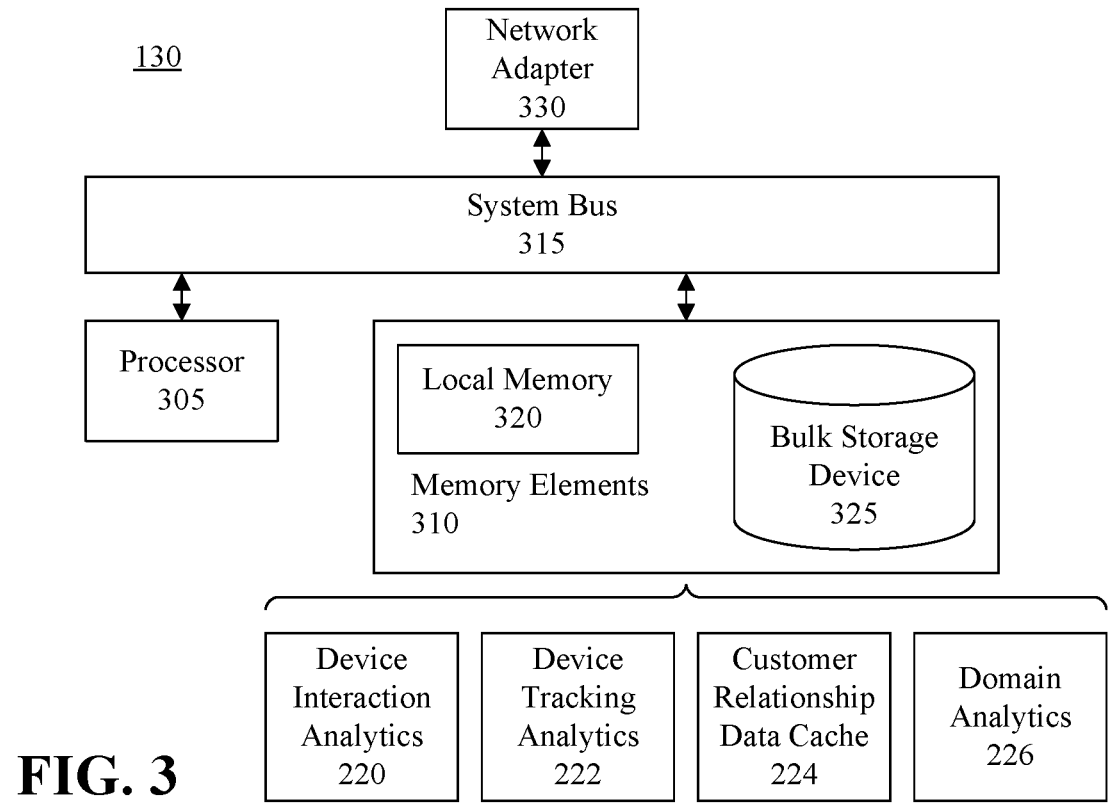
FIG. 3 is a block diagram illustrating example architecture for a community IoT concentrator.

FIG. 3 is a block diagram illustrating example architecture for a community IoT concentrator, such as the community IoT concentrator 130. The community IoT concentrator 130 can include at least one processor 305 (e.g., a central processing unit) coupled to memory elements 310 through a system bus 315 or other suitable circuitry. As such, the community IoT concentrator 130 can store program code within the memory elements 310. The processor 305 can execute the program code accessed from the memory elements 310 via the system bus 315. It should be appreciated that the community IoT concentrator 130 can be implemented in the form of any system including a processor and memory that is capable of performing the functions and/or operations described within this specification. For example, the community IoT concentrator 130 can be implemented as a server, a computer, a workstation, a mobile computer, a laptop computer, a tablet computer, a smart phone, a personal digital assistant, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The community IoT concentrator 130 also can include one or more cache memories (not shown) that provide temporary storage of at least some program code in order to reduce the number of times program code must be retrieved from the bulk storage device 325 during execution.

One or more network adapters 330 can be coupled to the community IoT concentrator 130 to enable the community IoT concentrator 130 to become coupled to devices within a device community, other systems, computer systems, remote printers, and/or remote storage devices through intervening private or public networks. Modems, cable modems, transceivers, and Ethernet cards are examples of different types of network adapters 330 that can be used with the community IoT concentrator 130.

As pictured in FIG. 3, the memory elements 310 can store the components of the community IoT concentrator 130, namely the device interaction analytics 220, device tracking analytics 222, a customer relationship data cache 224 and domain analytics 226. The datastore in which the device data 210 also can be stored to the memory elements 310, though this need not be the case. Being implemented in the form of executable program code, the device interaction analytics 220, device tracking analytics 222 and domain analytics 226 can be executed by the community IoT concentrator 130 and, as such, can be considered part of the community IoT concentrator 130. Moreover, the device interaction analytics 220, device tracking analytics 222, a customer relationship data cache 224, domain analytics 226 and datastore are functional data structures that impart functionality when employed as part of the community IoT concentrator 130. Data generated by the device interaction analytics 220, device tracking analytics 222 and domain analytics 226 can be output to, and stored within, memory elements 310. As used herein, "outputting" and/or "output" can mean storing in memory elements 310, for example, writing to a file stored in memory elements 310, writing to a display or other peripheral output device, playing audible notifications, sending or transmitting to another system, exporting, or the like.

Figure 4:
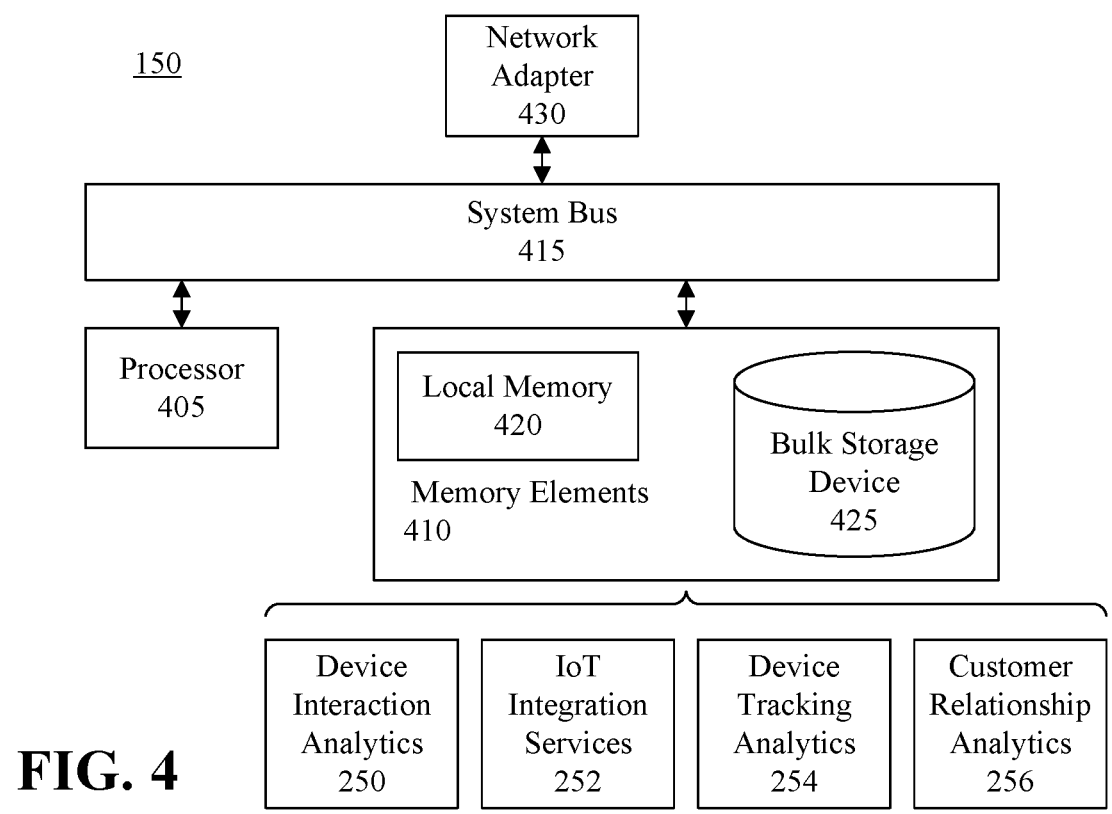
FIG. 4 is a block diagram illustrating example architecture for an enterprise IoT concentrator.

FIG. 4 is a block diagram illustrating example architecture for the enterprise IoT concentrator 150. The enterprise IoT concentrator 150 can include at least one processor 405 (e.g., a central processing unit) coupled to memory elements 410 through a system bus 415 or other suitable circuitry. As such, the enterprise IoT concentrator 150 can store program code within the memory elements 410. The processor 405 can execute the program code accessed from the memory elements 410 via the system bus 415. It should be appreciated that the enterprise IoT concentrator 150 can be implemented in the form of any system including a processor and memory that is capable of performing the functions and/or operations described within this specification. For example, the enterprise IoT concentrator 150 can be implemented as a server, a computer, a workstation, a mobile computer, a laptop computer, a tablet computer, a smart phone, a personal digital assistant, and so on.

The memory elements 410 can include one or more physical memory devices such as, for example, local memory 420 and one or more bulk storage devices 425. The enterprise IoT concentrator 150 also can include one or more cache memories (not shown) that provide temporary storage of at least some program code in order to reduce the number of times program code must be retrieved from the bulk storage device 425 during execution.

One or more network adapters 430 also can be coupled to enterprise IoT concentrator 150 to enable the enterprise IoT concentrator 150 to become coupled to other systems, computer systems, remote printers, and/or remote storage devices through intervening private or public networks. Modems, cable modems, transceivers, and Ethernet cards are examples of different types of network adapters 430 that can be used with the enterprise IoT concentrator 150.

As pictured in FIG. 4, the memory elements 410 can store the components of the enterprise IoT concentrator 150, namely the device interaction analytics 250, IoT integration services 252, device tracking analytics 254 and customer relationship analytics 256. The datastores in which the enterprise device data 240 and customer relationship data 242 also can be stored to the memory elements 410, though this need not be the case. Being implemented in the form of executable program code, the device interaction analytics 250, IoT integration services 252, device tracking analytics 254 and customer relationship analytics 256 can be executed by the enterprise IoT concentrator 150 and, as such, can be considered part of the enterprise IoT concentrator 150. Moreover, the device interaction analytics 250, IoT integration services 252, device tracking analytics 254 customer relationship analytics 256 and datastores are functional data structures that impart functionality when employed as part of the enterprise IoT concentrator 150. Data generated by the device interaction analytics 250, IoT integration services 252, device tracking analytics 254 and customer relationship analytics 256 can be output to, and stored within, memory elements 410.

Figure 5A:
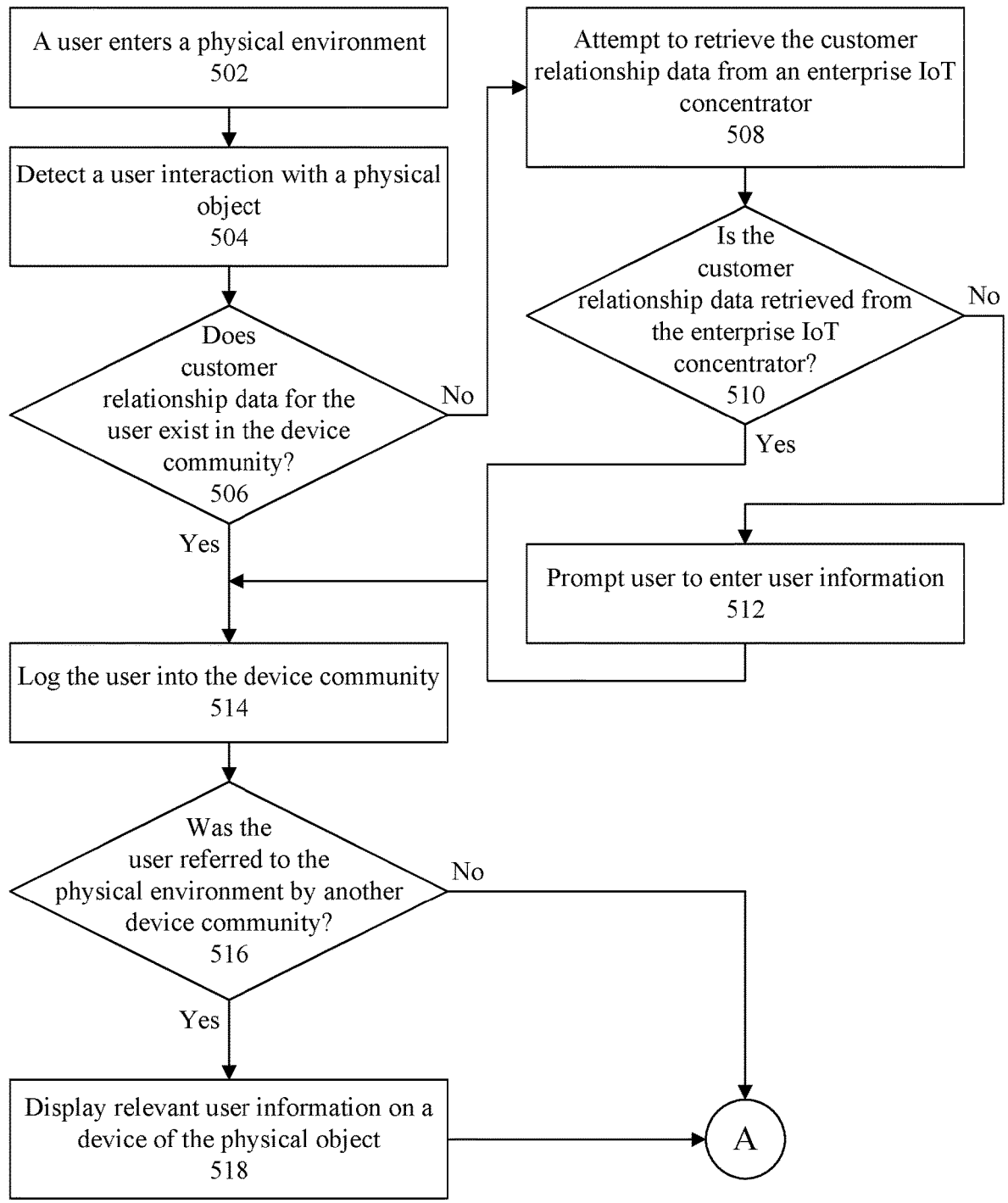
FIGS. 5a-5c present a flow chart illustrating an example of a method of initiating a physical object to perform a specific act that enhances an interaction of a user with physical object.
Figure 5B:
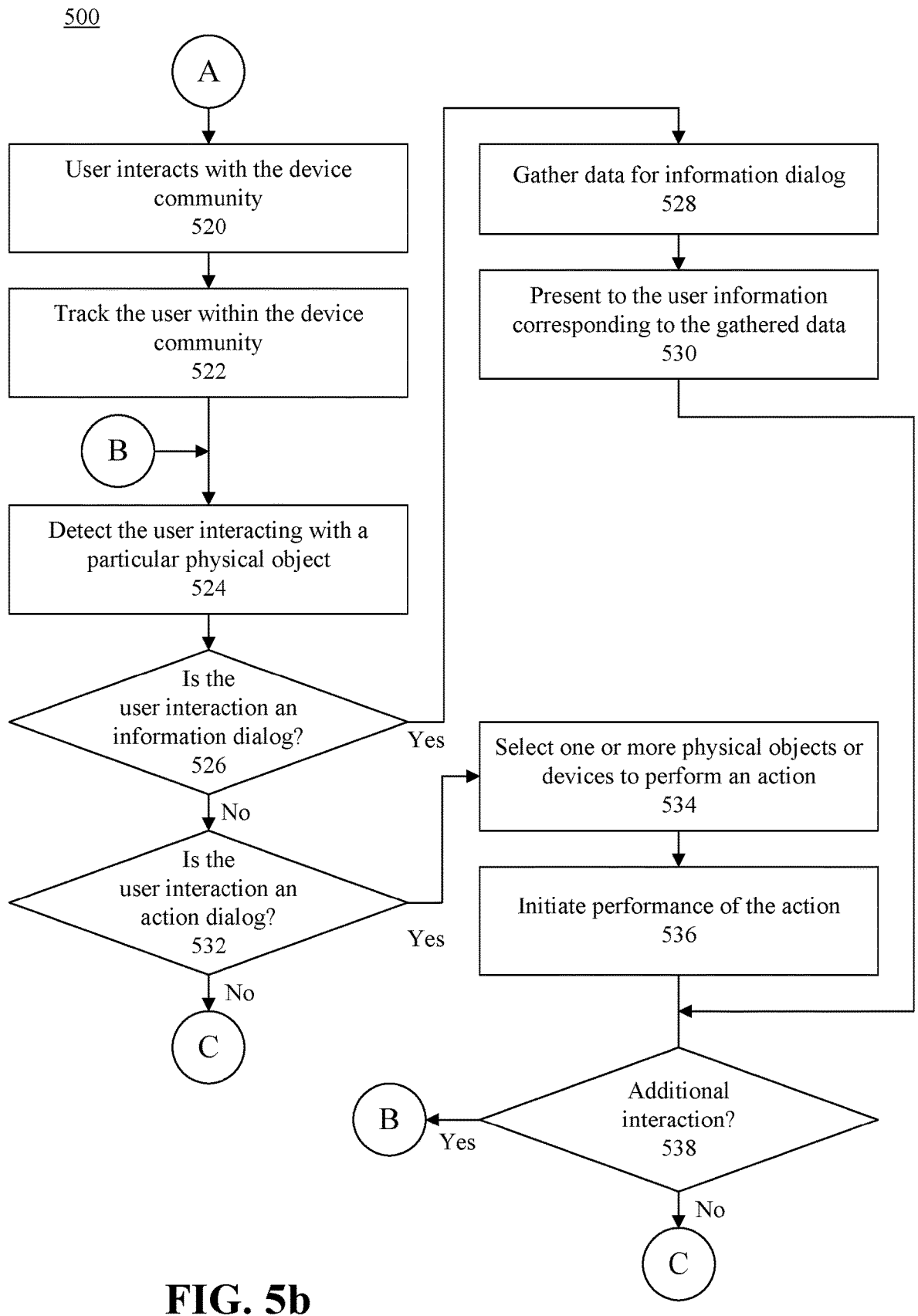
Figure 5C:
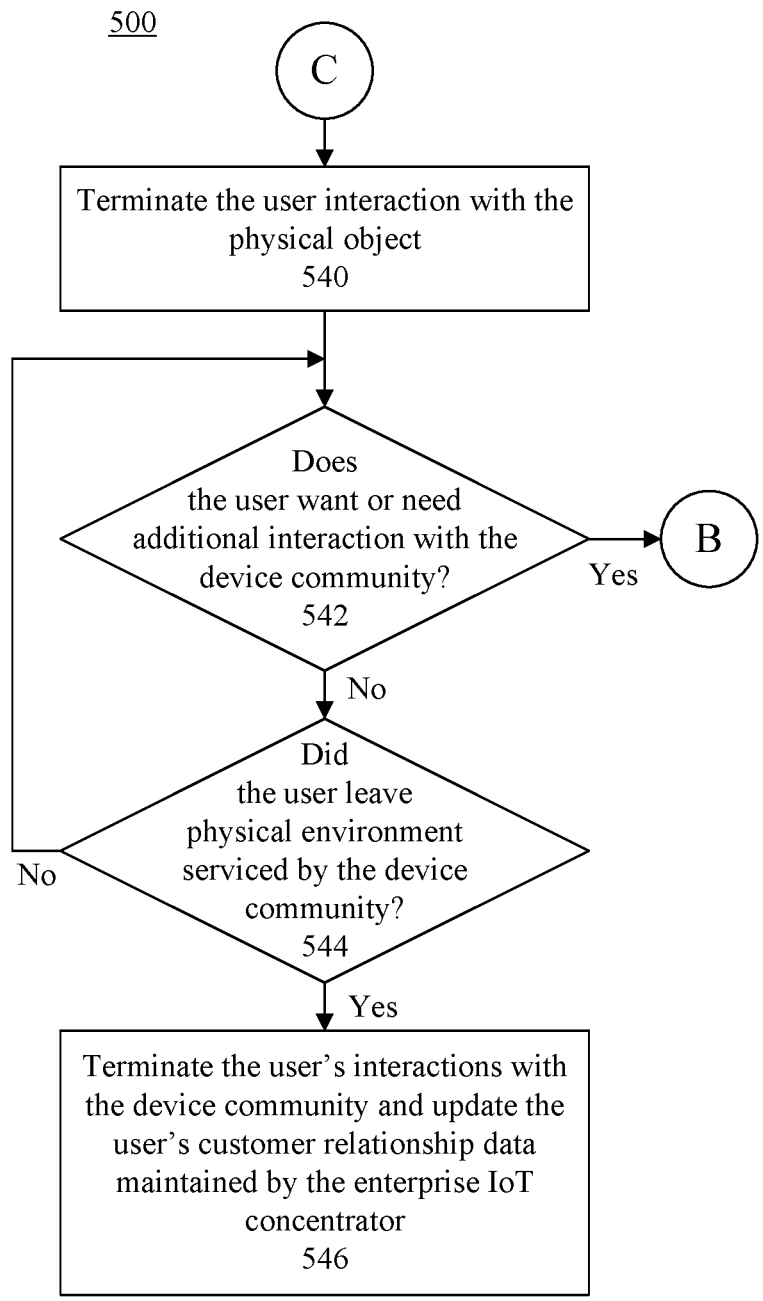

FIGS. 5a, 5b and 5c present a flow chart illustrating an example of a method 500 of initiating a physical object to perform a specific act that enhances an interaction of a user with physical object. Referring to FIG. 5a, at step 502, a user can enter a physical environment. For example, the user can enter a car lot, vehicle showroom or house that is for sale. At step 504, a user interaction with a physical object within a device community can be detected. In illustration, the physical object can include one or more devices with which the user interacts, and the devices can be members of a device domain within the device community. As noted, the devices can be communicatively linked to other devices in the device domain via an Internet of Things.

In one example, the physical object can be a kiosk located in a showroom. The kiosk can include devices, such as a processing system, touchscreen, display, keyboard, mouse, etc. The user can interact with processing system to review goods or services being sold at the location, explore various configurations of physical objects offered for sale, and the like. In another example, for example at a car dealership, the user can interact with vehicles being sold. For instance, the user can sit in a vehicle, interact with the vehicle's touchscreen and/or audio system, test drive the vehicle, etc. In a model home representing houses for sale, the user can interact with a home automation system, an intercom system, temperature control system, media system, security system, or the like. In another example, the device domain can include a beacon detectable by personal devices (e.g., smart phones, laptop computers, tablet computers and the like). The user's personal device can detect the beacon and the user can enter user inputs to connect his/her personal device to the device domain. Further, using Bluetooth® Low Energy (BLE), the user can be recognized via the user's personal device.

Referring to decision box 506, responsive to the user entering user a credential (e.g., a customer identifier and password/passcode), the user being automatically recognized using BLE or the user being recognized in another suitable manner, a community IoT concentrator for the device community can determine whether customer relationship data for the user exists within the device community (e.g., determine whether the customer relationship data is stored in a customer relationship data cache maintained by the community IoT concentrator). The existence of customer relationship data within the device community can indicate that the user has before visited the physical environment. Responsive to determining that the customer relationship data for the user exists within the device community, the community IoT concentrator can access the customer relationship data from the customer relationship data cache.

Responsive to determining that the customer relationship data for the user does not exist within the device community, at step 508 the community IoT concentrator can attempt to retrieve the customer relationship data for the user from an enterprise IoT concentrator, and access the customer relationship data if it is available. Referring to decision box 510, if the community IoT concentrator is not able to retrieve the customer relationship data from the enterprise IoT concentrator, for example if the user is has not before created a user account within the enterprise, at step 512 the user can be prompted to enter the user's identifying information, such as that previously described. The user also can be prompted to identify any specific physical objects in which the user has interest. For example, the user can be prompted to identify a particular vehicle and options in which the user is interested, identify particular furniture in which the user is interested, identify a particular type/size of home the user is interested in, etc.

In one arrangement, certain customer relationship data can be retrieved from the user's own physical object. For example, if the user's present vehicle is equipped with WiFi' and a suitable processing system, the user can configure the processing system to upload to the community IoT concentrator user preferences, for example a preferred radio station, a preferred temperature setting for the vehicles air conditioning/heating system, etc. Similarly, the user can configure the processing system of the user's home automation system to upload to the community IoT concentrator the user's home environment preferences.

Responsive to the user entering the identifying information and/or uploading user preferences, determining that the customer relationship data for the user exists within the device community or the community IoT concentrator accessing the customer relationship data from the enterprise IoT concentrator, at step 514 the community IoT concentrator can log the user into the device community. In the case that the user's customer relationship data was accessed locally by the community IoT concentrator, responsive to the community IoT concentrator identifying the user and/or logging the user into the device domain, the community IoT concentrator can access the enterprise IoT concentrator to update the user's customer relationship data. For example, if the user visited other physical environments (e.g., physical locations) serviced by device communities which are members of the same global IoT community as the present device community, additional customer relationship data for the user may have been generated and stored by the enterprise IoT concentrator. That data can be retrieved by the community IoT concentrator and processed to update the user's locally stored customer relationship data.

Referring to decision box 516, the community IoT concentrator can determine based on the customer relationship data, whether the user was referred to the physical environment by another device community. By way of example, the user may have visited a car dealership to look at a certain vehicle in a certain color or with certain options, and that car dealership may not have had such vehicle in stock. In such case, a sales associate at that car dealership may refer the user to another car dealership, such as the present physical environment, that has the desired vehicle in stock. Responsive to referring the user to the other car dealership, the sales associate can enter into the user's customer relationship data information pertaining to the vehicle in which the user is interested and the car dealership to which the user was referred. The user's local customer relationship data can be updated with such information as previously described. In another example, a user may look at homes in a particular city, but desire to also look at homes in development. In such case, a real estate agent may refer the user to another real estate office that serves the other development. Responsive to referring the user to the other real estate office, the real estate agent can enter into the user's customer relationship data information pertaining to the type of house in which the user is interested and the real estate office to whom the user was referred.

If at decision box 516 a determination is made that the user was referred to the physical environment by another device community, relevant user information can be displayed on the physical device with which the user is interacting in the present device community. For example, if the user is interacting with a kiosk, the kiosk can present to the user welcome information that welcomes the user by name, referral information pertaining to the sales associate that referred the user to the present physical environment, as well as other marketing information. Further, the kiosk can immediately direct the user to the physical object in which the user is interested. For example, if the user is interested in a particular vehicle in a particular color and with particular options, the kiosk can direct the user to that vehicle. In illustration, the kiosk can present to the user a map indicating where the desired vehicle is located, either in a showroom or on a car lot. If the user is interested in a particular type of home, the kiosk can direct the user to that home. For instance, the kiosk can present to the user a map indicating where the home is located. The customer can use the presented information to guide himself/herself to the desired physical object. In an arrangement in which the user desires to look at a home, via interaction with the kiosk, the user can contact the homeowner to arrange a time to visit the home.

In one arrangement, the community IoT concentrator can initiate the physical object to perform a specific act to enhance the user's interaction with the physical object. For example, the community IoT concentrator can initiate the vehicle in which the user is interested to beep its horn, thus helping guide the user to the vehicle. The community IoT concentrator also can initiate the vehicle to open a door, and/or initiate the vehicle to turn on an audio system and tune to a particular radio station. The radio station can be selected based on the user's customer relationship data. For example, if the customer relationship data indicates a preferred radio station, the audio system can be tuned to that radio station. The indication of the preferred radio station can be based on a particular radio station indicated by the user in the user's costumer relationship data, or a particular radio station to which the user has tuned one or more audio systems to when looking at vehicles. For example, if the user, when looking at a vehicle, tunes the audio system to a particular radio station, the audio system can communicate that information to the vehicles processing system, and the vehicle's processing system can communicate that radio setting to the community IoT concentrator serving the device community in which the vehicle is a member. The community IoT concentrator can store the information in its local customer relationship data cache. Moreover, such information can be communicated to the enterprise IoT concentrator and stored in the user's customer relationship data maintained by the enterprise IoT concentrator. If, however, the customer relationship data does not indicate a preferred radio station, the community IoT concentrator can process the customer relationship data to identify a demographic to which the user corresponds, and select a radio station that targets that demographic.

In an example in which the user will be looking at a house, the community IoT concentrator can initiate various devices/systems in the home to perform specific acts to enhance the user's experience when looking at the home. For example, if the customer relationship data indicates a preferred temperature, the community IoT concentrator can initiate the house's temperature control system to change the temperature setting to the preferred temperature. If the customer relationship data indicates a preferred radio station, the community IoT concentrator can initiate the house's media system to play that radio system. Again, the radio station can be selected based on the user's demographics, as previously described.

Referring to FIG. 5b, at step 520, the user can interact with the device community. For example, the user can interact with the kiosk or other physical objects in the device community. Through such interactions, the community IoT concentrator can gather and process data corresponding to the user to further enhance the user's experience with physical objects and within the device community as a whole.

At step 522, the community IoT concentrator can track the user within the device community. For example, the community IoT concentrator can track the user's interactions with various physical objects. The user's specific location can be determined, for example, by detecting the user's personal device being proximate to various devices within the device community using BLE, detecting the user interacting with various devices, etc.

At step 524, the community IoT concentrator can detect the user interacting with a particular physical object. For example, a dialog between the user and the physical object can be initiated. The interaction may include the user requesting more information about the physical object, the user asking the object to show its capabilities, the user inquiring about other physical objects with similar properties, etc. The physical object also can communicate information to the user. For example, one or more devices in the physical object can present to the user active suggestions, reviews provided by other users, financing options, etc. Throughout the user interaction, the community IoT concentrator can continually analyze the user's responses and process such information to enhance the user's experience with the physical object, for example by creating a personalized user experience with the physical object for the user, share important facts with other physical objects/devices, etc. Further, the community IoT concentrator can store data received, retrieved and generated for the user in the customer relationship data cache.

In illustration, at decision box 526 a determination can be made whether the user interaction is an information dialog. If so, at step 528 the community IoT concentrator can gather data for the information dialog from the local device community and/or the global IoT community. At step 530 the community IoT concentrator can be present to the user information corresponding to the gathered data. For example, the community IoT concentrator can process the data to generate the information to present to the user and communicate the information to the physical object with which the user is interacting, which can present the information on a display or present the information audibly. Such information can be relevant to the physical object with which the user is presently interacting (e.g., the information can be presented on a display within a vehicle) or can be relevant to another physical object (e.g., the information can be presented on a display of a kiosk or personal device and relevant to a vehicle or house the user is inquiring about).

In one arrangement, the information that is generated and presented to the user can be generated categorized and prioritized based on a user pattern of the user. For example, if data processed based on prior interactions of the user in the global IoT community indicate that the user is primarily concerned with a certain type of information, such as total price, financing options, schools for which a house or housing development is zoned (e.g., school ratings, number of students, number of teachers, etc.), shops, stores and restaurants in the vicinity of a house or housing development, and so on, information presented to the user can be presented to the user in an order that corresponds to the user pattern. Moreover, if the user tends to inquire about certain details while not inquiring about other details, the details the user tends to inquire about can be included in the information presented to the user, while details the user tends not to be concerned with need not be presented unless the user specifically requests such details be presented.

The information that is generated and presented to the user also can include comparison information for various physical objects the user has expressed interest or that match the user's criteria. For example, if the user has looked at a number of houses, the information can indicate similarities among the houses and differences between the houses. The information also can make recommendations as to other houses for sale that the user may be interested in, and present information about those houses to the user. Such recommendations can be generated by processing data indicating the types of homes, geographic regions, schools, entertainment venues, etc. in which the user has expressed interest or such interest can be inferred based on the user pattern of the user.

For data that is gathered from the local device community, the corresponding information can be presented to the user in real time. In one aspect, the data gathered from the local device community can include the data that is pre-populated from the global IoT community to the device community's customer relationship data cache. Further, additional data gathered quickly from the global IoT community also can be presented in real time. In some cases, depending on the volume of data being processed by the global IoT community, it may take some time for requested data to be received. Once the requested data is received, however, the community IoT concentrator can process the data to generate the information and communicate the information to the physical object. In such cases, while the data is being gathered and processed, the physical object can indicate to the user that the data is being gathered and soon will be presented.

In one arrangement, information obtained from the customer relationship data cache, the enterprise IoT concentrator 150 and/or user inputs can be processed by the community IoT concentrator to identify at least one social media system that is of interest to the user. Further, the community IoT concentrator can create a post in the social media system on behalf of the user based on such information. For example, the post can indicate the user and the physical object that is of interest to the user. As noted, the user can be prompted to authorize the post, and the post can be created with the user's approval.

Referring to decision box 532, the community IoT concentrator can determine whether the user interaction is an action dialog. If so, at step 534 one or more objects and/or devices to perform one or more actions can be selected by the community IoT concentrator based on information obtained from the user in the action dialog. In one aspect, the action(s) can be selected based not only on the information obtained in the action dialog, but in addition to or in lieu of such information, also based on a user profile of the user, a user pattern of the user and/or user preferences of the user. In one example, the user pattern can indicate that the user is particularly interested in the interiors of vehicles. For example, the user may have expressed an interest in a vehicle interior at the present car dealership or another car dealership. In such case, a selected action can include opening a door of a vehicle at a current car dealership the user is visiting. Opening the door can invite the user to explore the interior of the vehicle and enhance the interaction of the user with the vehicle. Further, if the user showed particular interest in a vehicle's audio system, a selected action can include turning on the audio system and tuning the radio to a particular radio station selected for the user, for example as previously described.

At step 536, the selected object(s) and/or device(s) can be initiated to perform the selected action. For example, if the user is directly interacting with a physical object for which the user desires the action to be performed, the physical object can perform the action. If, however, the user is interacting with a first physical object, and a determination is made that it is warranted to have a second physical object perform an action, the community IoT concentrator can initiate the second physical object to initiate the action. For example, the user may be interacting with a kiosk and inquire about the interior of a particular vehicle. In response to such inquiry, the community IoT concentrator can select a vehicle matching the user's inquiry and initiate the vehicle to open a door, thus inviting the user to sit in the vehicle and experience the vehicle's interior, thereby enhancing the user's experience with the vehicle. In illustration, the community IoT concentrator can send a command to a device in the vehicle (e.g., the vehicle's processing system) which trigger's the device to operate a solenoid that opens the vehicle door. Further, the community IoT concentrator can send a command to the vehicle's device that initiates activation of the vehicle's audio system and tunes the radio tuner to a radio station selected for the user. Further, the community IoT concentrator can commutate to the device a command to cause the vehicle to beep its horn, thereby attracting the user's attention and inviting the user to explore the vehicle.

In one arrangement, the actions that are initiated can be selected based on a user pattern of the user. For example, if data processed based on prior interactions of the user in the global IoT community indicate that the user is responsive to a beep of a horn or opening of a door, such actions can be implemented for the user to enhance the user's experience in the present physical environment. If, however, the user pattern of the user indicates that such actions do not attract the attention of the user, such actions need not be implemented. Instead, other actions, indicated by the user pattern of the user, to which the user typically will respond, can be initiated to enhance the user's experience in the present physical environment. The user pattern also can indicate device settings, and at least one device setting can be configured based on the user patter. For example, if the user pattern indicates a radio station the user prefers, the audio system of a vehicle or house can be configured to be tuned to that radio station for the user. In another example, the user pattern can indicate a particular user interface configuration preferred by the user, and the user interface of a vehicle or home automation system can be configured to present the user interface preferred by the user.

Further, data associated with the user (e.g., the user customer relationship data of the user, user pattern data and/or user preferences) can a level of interaction with physical objects the user desires. For example, the data can indicate that the user desires to sit inside a vehicle when looking at vehicles. Accordingly, at least one of the actions initiated for a vehicle can include opening the vehicles door. If the data indicates that the user desires to inspect the engine compartment, at least one of the actions initiated for a vehicle can include releasing a hood (or bonnet) latch. If the data indicates that the user desires to inspect the trunk, at least one of the actions initiated for a vehicle can include releasing a trunk (or boot) latch. If the data indicates that the user desires to listen to the audio system, at least one of the actions initiated for a vehicle or house can include turning on the audio system. If the data indicates that the user desires to listen to the motor while running, at least one of the actions initiated for a vehicle can include starting the motor. If the data indicates that the user desires to inspect a pool at a house, at least one of the actions can include turning on a water pump, hot tub, etc. Any such actions can be initiated by the community IoT concentrator by communicating corresponding signals to a device of the vehicle, such as the vehicle's processing system.

Referring to decision box 538, if additional user interactions with the physical object, or another physical object, are detected, the process can return to step 524. If not, the process can proceed to step 540 of FIG. 5c. Referring to FIG. 5c, at step 540 the interaction between the user and the physical object can terminate. For example, after consuming information presented by the physical object, the user can end the dialogue with the physical object by exiting the vicinity of the physical object, turning off the physical object, or showing infrequent interaction with the physical object.

At decision box 542, a determination can be made by the community IoT concentrator as to whether the user wants or needs additional interaction with the device community. For example, the community IoT concentrator can monitor the user's movements within the physical environment and determine whether the user initiates interaction with any physical objects. If it is determined that the user wants or needs additional interaction with the device community, the process can return to step 524 of FIG. 5b. If not, at decision box 544 a determination can be made by the community IoT concentrator whether the user has left the physical environment serviced by the device community. If not, the process can return to decision box 524. If the user has left the physical environment serviced by the device community, at step 546 the community IoT concentrator can terminate the user's interactions with the device community and update the user's customer relationship data in the customer relationship data maintained by the enterprise IoT concentrator in the global IoT community. Accordingly, such data can be made available to other device communities participating in the global IoT community. The data can include customer profile data, customer referrals, device usage data and any other data relevant to the user. In one aspect, the community IoT concentrator can be automated to perform periodic analytics on the data within the device community, and communicate the data and results of the analytics to the customer relationship data maintained by the enterprise IoT concentrator.

FIG. 6 presents a flow chart illustrating an example of a method 600 of initiating a device to perform a specific act that enhances security in a physical environment. In this example, each device domain can include one or more security devices which are communicatively linked within the device domain. Examples of such security devices include, but are not limited to, window sensors that detect window opening and/or closing, door sensors that detect door opening and/or closing, motion detectors, glass break sensors, cameras that detect video and/or still images, fire alarms, carbon monoxide detectors, automated light switches, automated door locks, and the like. The device interaction analytics and/or device tracking analytics of the community IoT concentrator can process signals and/or data received from the devices in the respective device community. Based on the signals and/or data, the security analytics can identify the occurrence of a security issue within a physical environment (e.g., a house, office or other physical structure). Examples of a security issue include, but are not limited to, unauthorized access (e.g., a break-in) into the physical environment indicated by one or more door/window sensors, motion detectors, glass break sensors, etc., a fire within the physical environment indicated by a fire detector, unsafe levels of carbon monoxide within the physical environment indicated by a carbon monoxide detector, and the like. The device interaction analytics and/or device tracking analytics of the enterprise IoT concentrator also can be configured to process data received from community IoT concentrators and signal community IoT concentrators to initiate devices to perform specific acts to enhance security.

Referring to step 602, an enterprise IoT concentrator can receive, from a first community IoT concentrator, first data corresponding to a security issue detected by at least one of a first plurality of devices located within a first physical environment. For example, responsive to a security sensor/detector, fire detector, carbon dioxide sensor and/or the like detecting a condition that is a threat to security of the physical environment, such device can communicate a corresponding signal or data to the first community IoT concentrator. The first community IoT concentrator can process the signal or data to generate the first data and communicate the first data to the enterprise IoT concentrator. In some instances, the enterprise IoT concentrator can receive from a plurality of community IoT concentrators first data corresponding to security issues detected by devices in a plurality of physical environments.

Responsive to receiving the first data, the enterprise IoT concentrator can process the first data to generate second data corresponding to the security issue. The second data can be configured to be processed by at least a second community IoT concentrator to initiate at least one of a second plurality of devices located within a second physical environment to perform a specific act that enhances security in the second physical environment. The second plurality of devices can be communicatively linked to one another within a second device domain, wherein the second device domain is a member of a second device community comprising the second community IoT concentrator.

At step 606, the enterprise IoT concentrator can communicate the second data corresponding to the security issue to at least the second community IoT concentrator. For example, if the first data indicates a break-in occurring in a particular neighborhood, the enterprise IoT concentrator can communicate the second data to each community IoT concentrator servicing homes in that neighborhood. Responsive to receiving the second data, each of the community IoT concentrators can initiate one or more devices in their respective device communities to perform specific acts that enhance security in the respective physical environments. For example, the community IoT concentrators can communicate signals and/or data to automatic light switches to cause the light switches to turn on lights, communicate signals and/or data to automatic door locks to cause the door locks to move to a locked position, communicate signals and/or data to door and/or window sensors to activate the door and/or window sensors, communicate signals and/or data to cameras to activate the cameras to begin recording video and/or capture still images, and the like. In an example in which the security issue is a fire, the community IoT concentrators can communicate signals and/or data to fire alarms to trigger fire alarms to generate an alert. Still, any number of other specific acts can be initiated in response to the enterprise IoT concentrator receiving the first data and the present arrangements are not limited in this regard.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by an enterprise Internet of Things (IoT) concentrator comprising at least one processor, from a first community IoT concentrator first data corresponding to a security issue detected by at least one of a first plurality of devices located within a first physical environment, the first plurality of devices communicatively linked to one another within a first device domain, wherein the first device domain is a member of a first device community comprising the first community IoT concentrator;

responsive to receiving, by the enterprise IoT concentrator, the first data corresponding to the security issue detected by the at least one of the first plurality of devices located within the first physical environment:
    processing, by the enterprise IoT concentrator, the first data to generate second data corresponding to the security issue, the second data configured to be processed by at least a second community IoT concentrator to initiate at least one of a second plurality of devices located within a second physical environment to perform a specific act that enhances security in the second physical environment, wherein the second plurality of devices are communicatively linked to one another within a second device domain, wherein the second device domain is a member of a second device community comprising the second community IoT concentrator; and
    automatically communicating, by the enterprise IoT concentrator, the second data corresponding to the security issue to at least the second community IoT concentrator.

2. The method of claim 1, wherein, responsive to receiving the second data, the second community IoT concentrator initiates at least one of the second plurality of devices located within the second physical environment to perform the specific act that enhances the security in the second physical environment.

3. The method of claim 1, wherein the enterprise IoT concentrator further receives from at least the second community IoT concentrator the first data corresponding to the security issue detected by the at least one of the first plurality of devices located within the first physical environment.

4. The method of claim 1, further comprising:
automatically communicating, by the enterprise IoT concentrator, the second data corresponding to the security issue to the first community IoT concentrator;
wherein, responsive to receiving the second data, the first community IoT concentrator initiates at least one of the first plurality of devices located within the first physical environment to perform a specific act that enhances security in the first physical environment.

5. The method of claim 1, further comprising:
automatically communicating, by the enterprise IoT concentrator, the second data corresponding to the security issue to the first community IoT concentrator;
wherein, responsive to receiving the second data, the first community IoT concentrator initiates at least one of the first plurality of devices located within the first physical environment to perform a specific act that enhances security in the first physical environment; and, responsive to receiving the second data, the second community IoT concentrator initiates at least one of the second plurality of devices located within the second physical environment to perform the specific act that enhances the security in the second physical environment.

6. The method of claim 1, wherein the first device community and the second device community cooperate with one another, via the enterprise IoT concentrator, to provide the security in the first physical environment and the second physical environment.

7. The method of claim 1, wherein the specific act that enhances security in the second physical environment is an activation of at least one device pertinent to security in the second physical environment.

8. A system, comprising:
a processor programmed to initiate executable operations comprising:
receiving, by an enterprise Internet of Things (IoT) concentrator comprising at least one processor, from a first community IoT concentrator first data corresponding to a security issue detected by at least one of a first plurality of devices located within a first physical environment, the first plurality of devices communicatively linked to one another within a first device domain, wherein the first device domain is a member of a first device community comprising the first community IoT concentrator;
responsive to receiving, by the enterprise IoT concentrator, the first data corresponding to the security issue detected by the at least one of the first plurality of devices located within the first physical environment:
    processing, by the enterprise IoT concentrator, the first data to generate second data corresponding to the security issue, the second data configured to be processed by at least a second community IoT concentrator to initiate at least one of a second plurality of devices located within a second physical environment to perform a specific act that enhances security in the second physical environment, wherein the second plurality of devices are communicatively linked to one another within a second device domain, wherein the second device domain is a member of a second device community comprising the second community IoT concentrator; and
    automatically communicating, by the enterprise IoT concentrator, the second data corresponding to the security issue to at least the second community IoT concentrator.

9. The system of claim 8, wherein, responsive to receiving the second data, the second community IoT concentrator initiates at least one of the second plurality of devices located within the second physical environment to perform the specific act that enhances the security in the second physical environment.

10. The system of claim 8, wherein the enterprise IoT concentrator further receives from at least the second community IoT concentrator the first data corresponding to the security issue detected by the at least one of the first plurality of devices located within the first physical environment.

11. The system of claim 8, the executable operations further comprising:
automatically communicating, by the enterprise IoT concentrator, the second data corresponding to the security issue to the first community IoT concentrator;
wherein, responsive to receiving the second data, the first community IoT concentrator initiates at least one of the first plurality of devices located within the first physical environment to perform a specific act that enhances security in the first physical environment.

12. The system of claim 8, the executable operations further comprising:
automatically communicating, by the enterprise IoT concentrator, the second data corresponding to the security issue to the first community IoT concentrator;
wherein, responsive to receiving the second data, the first community IoT concentrator initiates at least one of the first plurality of devices located within the first physical environment to perform a specific act that enhances security in the first physical environment; and, responsive to receiving the second data, the second community IoT concentrator initiates at least one of the second plurality of devices located within the second physical environment to perform the specific act that enhances the security in the second physical environment.

13. The system of claim 8, wherein the first device community and the second device community cooperate with one another, via the enterprise IoT concentrator, to provide the security in the first physical environment and the second physical environment.

14. The system of claim 8, wherein the specific act that enhances security in the second physical environment is an activation of at least one device pertinent to security in the second physical environment.

15. A computer program product comprising a computer readable storage medium having program code stored thereon, the program code executable by a processor to perform a method comprising:
   receiving, by an enterprise Internet of Things (IoT) concentrator comprising at least one processor, from a first community IoT concentrator first data corresponding to a security issue detected by at least one of a first plurality of devices located within a first physical environment, the first plurality of devices communicatively linked to one another within a first device domain, wherein the first device domain is a member of a first device community comprising the first community IoT concentrator;
   responsive to receiving, by the enterprise IoT concentrator, the first data corresponding to the security issue detected by the at least one of the first plurality of devices located within the first physical environment:
      processing, by the enterprise IoT concentrator, the first data to generate second data corresponding to the security issue, the second data configured to be processed by at least a second community IoT concentrator to initiate at least one of a second plurality of devices located within a second physical environment to perform a specific act that enhances security in the second physical environment, wherein the second plurality of devices are communicatively linked to one another within a second device domain, wherein the second device domain is a member of a second device community comprising the second community IoT concentrator; and
      automatically communicating, by the enterprise IoT concentrator, the second data corresponding to the security issue to at least the second community IoT concentrator.

16. The computer program product of claim 15, wherein, responsive to receiving the second data, the second community IoT concentrator initiates at least one of the second plurality of devices located within the second physical environment to perform the specific act that enhances the security in the second physical environment.

17. The computer program product of claim 15, wherein the enterprise IoT concentrator further receives from at least the second community IoT concentrator the first data corresponding to the security issue detected by the at least one of the first plurality of devices located within the first physical environment.

18. The computer program product of claim 15, the method further comprising:
   automatically communicating, by the enterprise IoT concentrator, the second data corresponding to the security issue to the first community IoT concentrator;
   wherein, responsive to receiving the second data, the first community IoT concentrator initiates at least one of the first plurality of devices located within the first physical environment to perform a specific act that enhances security in the first physical environment.

19. The computer program product of claim 15, the method further comprising:
   automatically communicating, by the enterprise IoT concentrator, the second data corresponding to the security issue to the first community IoT concentrator;
   wherein, responsive to receiving the second data, the first community IoT concentrator initiates at least one of the first plurality of devices located within the first physical environment to perform a specific act that enhances security in the first physical environment; and, responsive to receiving the second data, the second community IoT concentrator initiates at least one of the second plurality of devices located within the second physical environment to perform the specific act that enhances the security in the second physical environment.

20. The computer program product of claim 15, wherein the first device community and the second device community cooperate with one another, via the enterprise IoT concentrator, to provide the security in the first physical environment and the second physical environment.

* * * * *